United States Patent [19]

Fare et al.

[11] 4,019,694
[45] Apr. 26, 1977

[54] SEMIAUTOMATIC LOADING OF TAPE TRANSPORTS

[75] Inventors: Carlo Fare; Francesco De Bartolomeis, both of Milan, Italy

[73] Assignee: Honeywell Information Systems Italia, Milan, Italy

[22] Filed: Dec. 15, 1975

[21] Appl. No.: 641,125

[30] Foreign Application Priority Data

Dec. 20, 1974 Italy .................................. 30808/74

[52] U.S. Cl. ................................ 242/182; 226/95; 226/118; 242/195

[51] Int. Cl.² .................. G11B 15/66; G11B 15/58

[58] Field of Search .......... 242/182, 183, 184, 185, 242/195; 226/95, 97, 118, 91, 92; 360/83, 90

[56] References Cited

UNITED STATES PATENTS 3,751,604  8/1973  Calizzano et al. ................... 242/182
3,854,674  12/1974  Herger et al. ...................... 242/182

Primary Examiner—George F. Mautz
Attorney, Agent, or Firm—Ronald T. Reiling

[57] ABSTRACT

In a tape transport of the type where tape traveling between a pair of tape reels is selectively moved past a recording/readout station by externally controlled capstan means, a novel, semiautomatic system is provided for loading the tape into the transport. In accordance with the present invention, this is accomplished by manual insertion of the tape into a first tape path and by subsequent, stepwise automatic loading into a second tape path when predetermined operating conditions in the transport are present. Transport disabling means, normally operative in the absence of the aforesaid operating conditions, are inhibited during the tape loading operation, becoming operative again when the transport is fully loaded and ready for normal operation. Apparatus for loading tape in this manner avoids the time delays and reliability problems of fully manual loading systems, as well as the high cost and lack of reliability in certain critical areas of fully automatic tape loading equipment.

6 Claims, 5 Drawing Figures

SEMIAUTOMATIC LOADING OF TAPE TRANSPORTS

BACKGROUND OF THE INVENTION

The present invention relates to tape loading systems for tape transports and more particularly to semiautomatic tape loading systems for transports of the type wherein tape traveling between a pair of reels is moved past a recording/readout station by capstan means.

Capstan driven tape transports, particularly those used for magnetic recording and readout in incremental steps, are well-known in the art. In transports of this type, the capstan means may, for example, consist of a single capstan positioned in the vicinity of the magnetic recording/readout head. The tape charcteristically travels between a pair of reels, one of which may be permanently mounted on the machine and the other removable therefrom to store the tape. The reels are selectively adapted to dispense or receive the tape, with loop chambers frequently straddling the capstan means along the tape path and serving a buffering function between the rapid tape motion imparted by the capstan means and the slower-moving, relatively high-inertia tape reels and associated reel motors. While the capstan means characteristically operate under control of an externally derived signal, e.g. one derived from an associated computer, the reels are independently rotated, usually under control of signals derived from a device which monitors the length of the tape loop in each loop chamber. In order to retain tension in the tape, each loop chambers conventionally has vacuum pressure applied thereto.

In prior art tape transports of the type described, the tape is characteristically loaded either entirely by the manual intervention of the operation, or in a fully automatic manner. Manual loading requires extensive assistance from the operator over and beyond the act of placing and locking the tape reel on the appropriate spindle of the transport. The operator is required to thread the leading end of the tape carried by the removable tape reel, through the entire operating tape path, including the various tape guides, the vacuum chambers and the intermediately positioned capstan means, all the way to the permanent tape reel to which the tape end must then be secured. The time involved in this operation, which may be required many times a day in the average computer installation, is normally greater than what is considered tolerable, particularly so where the same operator is further required to attend to a number of other machines of a computer system carrying out various and diverse functions. Further, the chance of error for all but the most experienced operators is high. Improper tape loading risks the destruction of at least a portion of the tape, in addition to the accompanying time delays. Further, full manual tape loading further requires that the vacuum chambers be opened, which gives rise to the possibility of introducing dirt and causing a malfunction of the transport.

The above-described disadvantages of manual loading are largely avoided where apparatus is provided to carry out fully automatic tape loading. Here, operator intervention is not required except to place the tape reel onto the spindle of the transport. However, the cost of a fully automated tape loading system is relatively high. Further, while operator error is avoided, equipment malfunction may still occur and such equipment has been known to operate at relatively low reliability. Problems have occurred in conjunction with the locking of the removable reel in tape transports having fully automatic tape loading system, as well as with the locking of the leading end of the tape to the permanent reel of the transport. In addition, the complexity required of fully automatic tape loading systems usually means that they are expensive, as well as difficult to maintain in proper operating condition. Thus, neither fully manual nor fully automatic prior art tape loading apparatus has heretofore been able to reconcile the requirements of low cost and high reliability with the delicate handling required by the tape medium.

SUMMARY OF THE INVENTION

The present invention avoids the foregoing disadvantages by providing a tape loading system which requires relatively little operator assistance to place the tape into a minimal first tape path. Subsequently, the tape is shifted automatically in sequential steps into its final operating path. The entire tape loading operation is accomplished in a relatively simple manner, requiring no expensive or complicated modifications of existing tape transports and providing considerably greater reliability over presently available tape loading apparatus.

These and other features and advantages will appear more clearly from a detailed description of a preferred embodiment of the invention, and from the attached drawings, wherein:

DESCRIPTION OF THE PREFERRED EMBODIMENT

Figure 1:
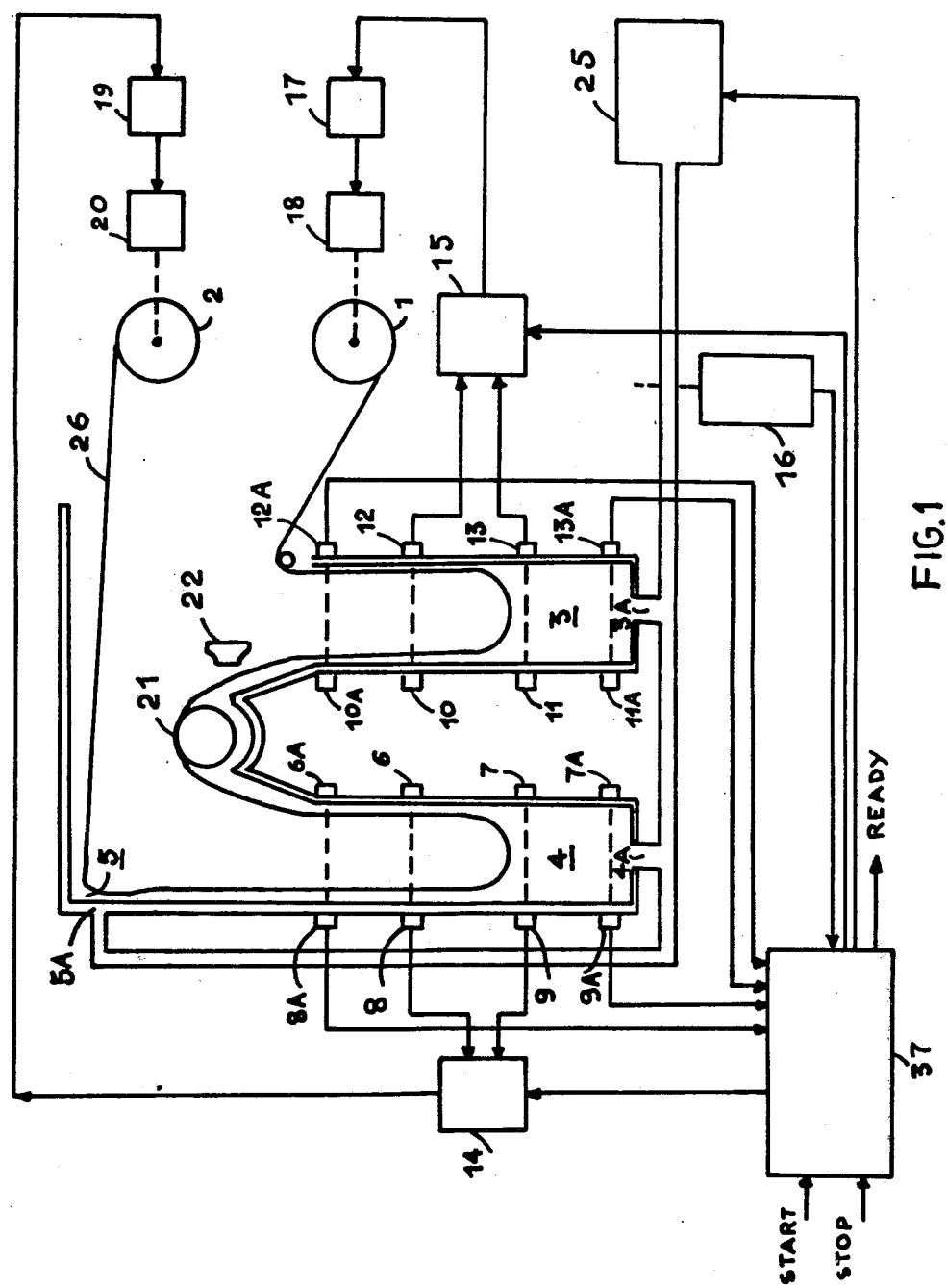
FIG. 1 illustrates in schematic form a tape transport of the type to which the present invention is applicable.

As shown in the tape transport illustrated in FIG. 1, a tape 26 travels between a pair of tape reels 1 and 2. Reel 2 is preferably installed permanently on the transport, while reel 1 is removable from the spindle. The tape transport includes a pair of columnar loop chambers 3 and 4 open at the top, and capstan means, shown in FIG. 1 as a single capstan 21 located above the loop chambers and symmetrically positioned relative to the latter. A magnetic recording/readout head 22, (which is also capable of erasing recorded data), is positioned in the tape path adjacent the capstan 21. The function of the capstan is to move tape relative to the magnetic head in response to externally received commands. The tape path between loop chamber 4 and tape reel 2 further includes a defined region 5 of an enclosed compartment of the transport, which will be explained in greater detail below.

In order to monitor the position of the tape loop in loop chamber 3, a set of photoemitters 10A, 10, 11, and 11A is positioned along the length of the chamber column. The photoemitters cooperate with a set of oppositely positioned photodetectors 12A, 12, 13 and 13A. Detectors 12A and 13A are electrically connected to a control network 37 and they define between them, in conjunction with their corresponding photoemitters, an operating zone setting maximum limits for the position of the tape loop in loop chamber 3. Detectors 12 and 13 are connected to a control network 15 and they define between them a working zone within which the tape loop is normally positioned in chamber 3. Similarly, loop chamber 4 contains a set of photoemitters 6A, 6, 7 and 7A positioned along the length thereof, cooperating with a set of oppositely positioned photodetectors 8A, 8, 9 and 9A. Detectors 8A and 9A are electrically connected to the aforesaid control network 37 and they define between them, in conjunction with their corresponding photoemitters, a maximum operating zone for the tape loop in loop chamber 3. Detectors 8 and 9 are connected to a control network 14 and they define between them a working zone within which the tape loop in chamber 3 is normally positioned.

The transport further includes a vacuum pump 25 which is coupled to the vacuum chambers 3 and 4 by means of openings 3A and 4A respectively, positioned at the lower ends of the chambers. Vacuum pump 25 is further coupled to the aforesaid region 5 and is adapted to apply vacuum pressure to the latter by way of an opening 5A. The pump is connected to receive control signals from network 37. A pressure transducer 16 is positioned in the output of pump 25 to monitor the vacuum pressure level and is connected to apply a responsive output signal to network 37.

A reversible reel motor 20 is mechanically coupled to the permanent tape reel 2 and is adapted to rotate the latter in a selected direction so as to dispense or receive tape. Motor 20 is connected to be energized by a power amplifier 19, which itself is connected to control network 14. As stated above, network 14 is connected to receive inputs from photodetectors 8 and 9 as well as from control network 37.

In similar manner, control network 15 receives inputs from control network 37 and from photodetectors 12 and 13 respectively, its output being connected to a power amplifier 17 which, in turn, is connected to energize a reversible reel motor 18. The latter is coupled to control the rotation of the removable tape reel 1, so as to cause the latter to dispense or receive tape. As shown in FIG. 1, network 37 additionally has provision for receiving START and STOP signals respectively at its input and to generate a READY signal at its output.

Figure 2A:
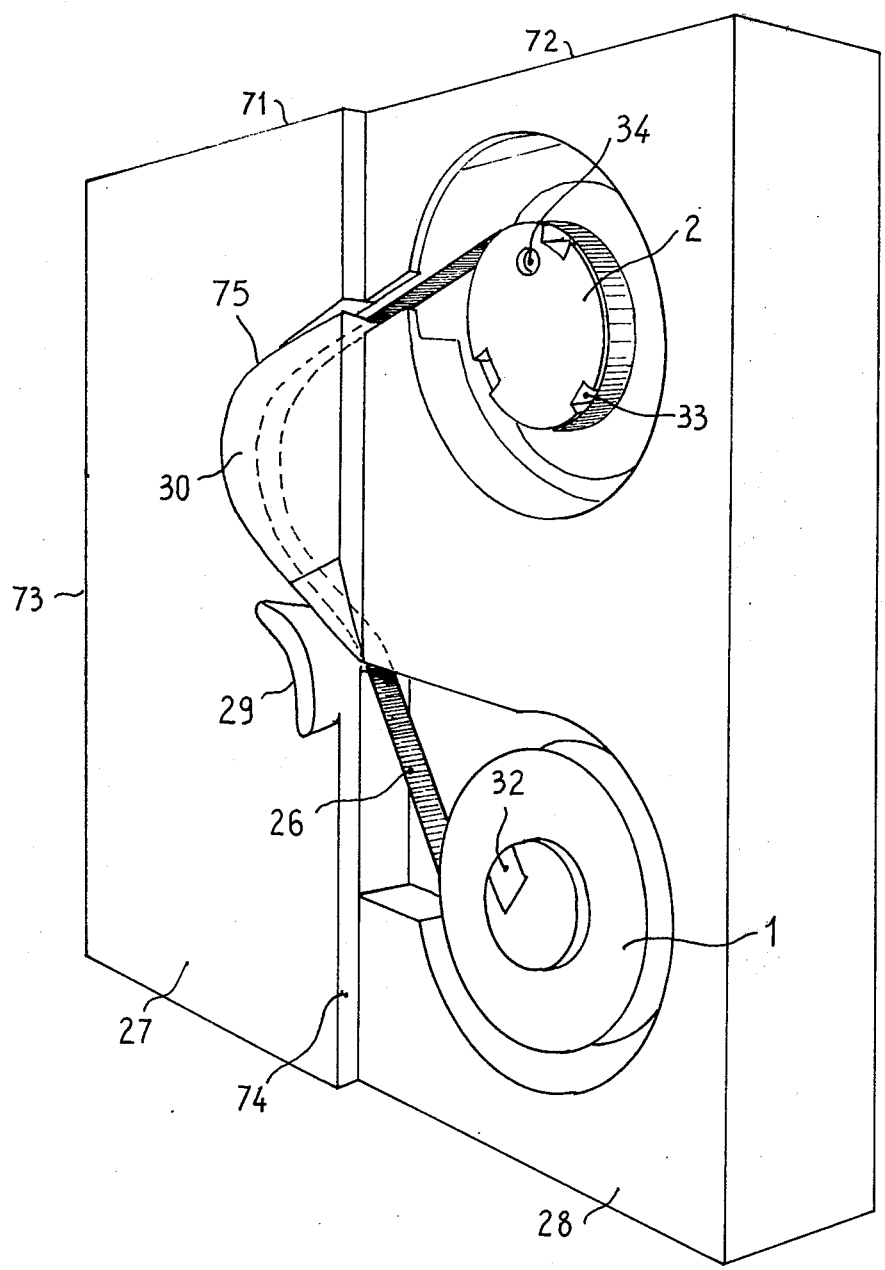
FIGS. 2a and 2b illustrate different perspective views of a tape transport embodying a preferred embodiment of the present invention.
Figure 2B:
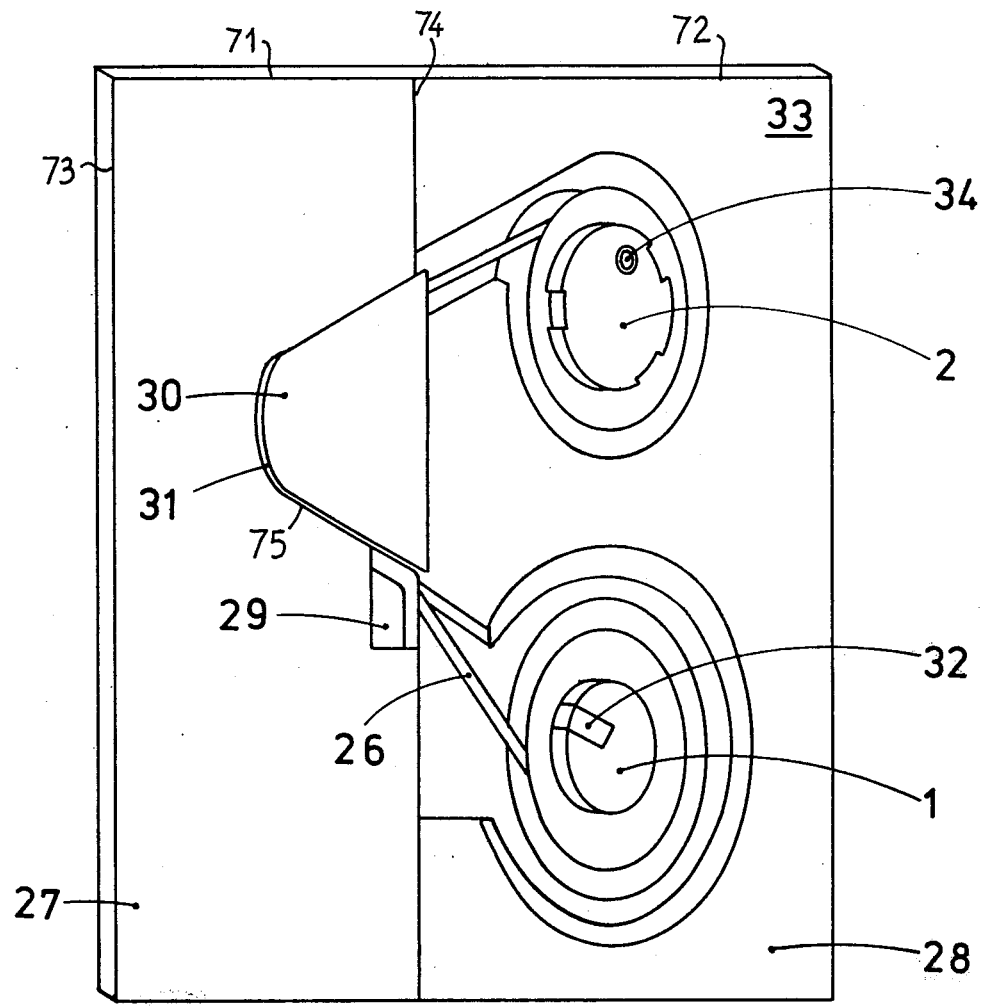

FIGS. 2a and 2b illustrate in greater detail the mechanical elements of the present invention, in particular the features of the manual tape loading arrangement. Applicable reference numerals, as used in FIG. 1, have been retained. As shown, the tape transport consists of a pair of sections 71 and 72, Section 71 constitutes an enclosed compartment, whose depth is defined by a pair of parallel walls spaced from each other a distance minimally exceeding the width dimension of the tape 26. The front wall constitutes a door 27 hinged at its left-hand edge 73. A handle 29 permits the door to be opened to provide access to the interior of the compartment 71. The door 27 is seen to have a cut-out section 75, extending from the opening door edge 74. The cut-out section accommodates a cover 30, disposed in sliding relationhip relative to the door to permit access to the magnetic head which is positioned beneath the cover.

The cover 30, which is shaped to approximate a triangle with a rounded apex, mates with the cut-out section 75 such that, when both the cover and the door 27 are in their closed position, a slot 31 is defined therebetween. The configuration of the slot is essentially that of the aforesaid triangle without the triangle base and it partially determines the shape of the tape path when the tape is first inserted manually into the slot.

As is best seen from FIG. 2a, and door handle 29 presents a contoured surface that continues the configuration of the slot 31. The handle surface that is presened to the tape slopes inwardly toward the door so as to facilitate manual insertion of the tape into the slot.

Section 72 of the tape transport includes a plate 28 which has suitable provisions for permanently mounting tape reel 2 and to receive the removable tape reel 1. The tape reels are preferably disposed in vertical alignment with each other. As shown in the drawings, removable reel 1 is provided with a lever 32 which permits the reel to be locked and unlocked quickly from its hub. Reel 2 also includes a flange suitably shaped to keep the tape from sliding off and thereby enabling the operator to fasten the free end of the tape uncoiled from the removable reel, to permanent reel 2 with relatively little effort. In this operation, the operator need only use one hand to keep the free tape end in place, his other hand being available to rotate reel 2 by inserting a finger into a hole 34, suitably provided for this purpose. Reel 2 further includes suitable groove 33 which assist in securing the tape to the reel.

Figure 3:
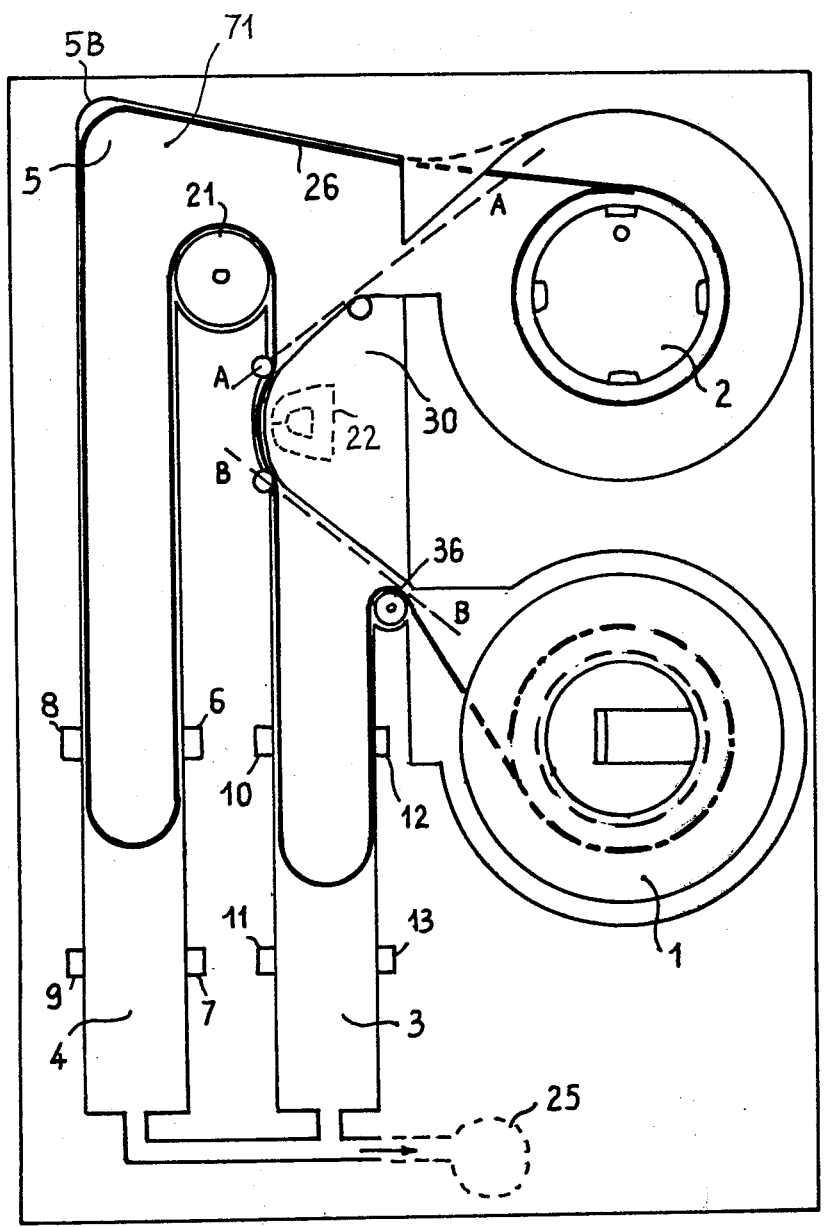
FIG. 3 illustrates in greater detail certain features of the tape loading system in accordance with the present invention.

FIG. 3 illustrates the interior of compartment 71, showing the path of tape 26 when the latter is in its operating position. As shown, the tape is dispensed by reel 2 and enters defined region 5 of compartment 71. There, the tape is sucked into contact with an interior guide surface 5B, causing it to conform to the latter. The guide surface is seen to consist of two substantially planar portions positioned at an angle with respect to each other and connected by a curved portion in the region where vacuum pressure is applied. One of the planar guide surface portions is aligned with one of the tape contacting walls of loop chamber 4 so as to form an extension thereof.

From region 5, the operating path of the tape continues to loop chamber 4 and thence to capstan 21 whose frictional tape contacting surface is adapted to impart the motion of the capstan to the tape to cause the latter to move magnetic head 22. The operating tape path continues from the capstan to loop chamber 3 and from the latter, by way of guide roller 36, to removable tape reel 1.

The conventional elements of the tape transport shown in the drawings act in accordance with their normal function during transport operation. Thus, in response to externally derived signals, e.g. signals received from a central processing unit, the capstan 21 applies motion to the tape relative to the magnetic head 22. If the motion of the capstan 21 is in a counterclockwise direction, it causes the tape loop in the loop chamber 3 to shorten and, correspondingly, the tape loop in the loop chamber 4 to lengthen. If the position of the tape loop in loop chamber 3 rises above the defined working zone, such condition is detected by the photoelectric monitoring means, (photoemitters 10, 11 and photodetectors 12, 13), and a suitable signal is sent to control network 15. The control network generates a responsive signal which, upon amplification by power amplifier 17, energises reversible motor 18 to impart motion to the tape reel 1 in the appropriate direction to correct the imbalance. In the chosen example where capstan 21 rotates in a counter-clockwise direction to shorten the loop in chamber 3, the signal applied by control network 15 will cause motor 1 to rotate in a clockwise direction so as to dispense tape into the loop chamber. Conversely, if the motion of capstan 21 is in a clockwise direction so as to cause the tape loop in loop chamber 3 to fall below the limits of the working zone, tape reel 1 will be rotated in a counter-clockwise direction to take up the excess tape until the loop is again positioned inside the working zone. The situation is substantially identical for loop chamber 4, with control network 14, power amplifier 19, motor 20 and tape reel 2 providing corresponding action.

The tape transport also includes protective features to disable the operation thereof when certain predetermined operating conditions are not present. As will be seen from the drawings, the maximum operating zone in each loop chamber straddles the normal working zone therein. Thus, when the limits of the operating zone, in loop chamber 3, as defined by photoelectric monitoring means 10A–12A and 11A–13A respectively are exceeded, control network 37 issues a disabling signal to halt further operation of the transport. The operation is identical if the limits of the operating zone in loop chamber 4 are exceeded by the tape loop.

Pressure tranducer 16 monitors the vacuum pressure at the output of vacuum pump 25 so as to maintain a predetermined pressure level required for proper operation of the loop chambers and of compartment region 5. Any deviation from this pressure level, (within predetermind tolerance limits), causes an appropriate signal to be applied to control network 37. As before, a responsive disabling signal is generated in such a case to bring the operation of the tape transport to a halt.

The semiautomatic tape loading apparatus which forms the subject matter of the present invention divides the tape loading operation into a manual loading phase succeeded by a sequenced automatic loading phase. In the manual loading phase, the operator, having mounted removable tape reel 1 and securely locked it in position, takes the leading end of the tape 26 and threads it along first path extending into compartment 71 between the externally positioned tape reels 1 and 2 and having a configuration defined in part by slot 31. As previously explained, the insertion of the tape into the slot 31 is facilitated by the contoured surface of the door handle 29 which continues the configuration of the slot 31. Further, the inward slope of the handle surface assists in guiding the tape dispensed by reel 1 into slot 31. The door 27, as well as the cover 30 are both in their closed position during the manual tape loading operation. Once the tape has been threaded into the slot, the leading tape end is secured to permanent reel 2 by rotating the latter several times using hole 34, as explained above.

It will be noted that the tape path into which the tape is threaded during manual loading follows a simple configuration which, within compartment 71, encompasses substantially only the magnetic head 22. As a consequence, this portion of the loading operation can be quickly carried out by even an inexperienced operator. Further, since the tape is manually fastened to reel 2, the operator has assurance that the tape is securely anchored thereto.

Following the completion of the manual loading phase, the automatic tape loading phase is initiated e.g. by means of a start button or switch which causes a START signal to be applied to control network 37. The network responds by generating a suitable signal to the operation of the vacuum pump 25. The action of the pump serves to apply vacuum pressure to the lower ends of loop chambers 3 and 4 as well as to the defined compartment region 5. While the tape 26 is in its first path, the loop chambers and the region 5 communicate with each other so that vacuum pressure is essentially applied to the entire compartment 71. Since the openings through which the tape passes into the compartment are relatively small and are partially blocked by the tape itself, the vacuum pump is able to provide the desired predetermined pressure level in the compartment.

When the aforesaid predetermined level has been attained, as monitored by pressure transducer 16, motor 20 is suitably energized to rotate reel 2 in a counter-clockwise direction so as to dispense tape. In the preferred embodiment of the invention, as illustrated in FIG. 3, the geometry of compartment 71 is chosen such that the suction exerted in zone A—A is greater than that exerted in zone B—B. Accordingly, the tape dispensed by the reel 2 is first sucked into the defined compartment region 5 where it is caused to conform to the internal guide surface 5B. Subsequently, the vacuum pressur applied to the bottom end of loop chamber 4 causes a tape loop to be formed therein. Since the capstan 21 is stationary during the automatic loading phase and the frictional capstan surface precludes tape slippage, the tape loop in chamber 4 is under tension, particularly after the rotation of tape reel 2 is completed.

The photoelectric position monitoring means in loop chamber 4 detect the presence of the loop therein. As soon as the tape reaches the working zone of the loop chamber, motor 20, which drives reel 2, is de-energized and the tape loop remains positioned in the working zone. If by reason of motor and reel inertia the tape loop overshoots the lower limit of the working zone, as defined by photosensitive monitoring means 7, 9, motor 20 is energized to rotate in the reverse direction to again bring the tape loop into the desired working zone and is subsequently de-energized.

During the foregoing steps of the automatic tape laoding phase, the friction of the stationary capstan surface opposes the formation of a tape loop in loop chamber 3, notwithstanding the application of vacuum pressure to the later. However, after a sufficient time interval has elapsed to assure that the tape loop is appropriately positioned in the working zone of loop chamber 4, reel motor 18 is energized to cause tape reel 1 to dispense tape into loop chamber 3. As tape is dispensed by tape reel 1, the vacuum pressure applied to loop chamber 3 causes a tape loop to be formed therein under tension and to be positioned inside the working zone of that chamber. Here again, the presence of the tape loop in the working zone is detected by the photoelectric monitoring means associated with loop chamber 3. As is the case in loop chamber 4, reel motor 18 is de-energized when the loop is properly positioned in the working zone, or the motor is reverse-energeized if the working zone has been overshot. The tape 26 is now in its normal operating path which extends between both tape reels and which encompasses, within compartment 71, the internal guide surface 5B, loop chamber 4, capstan 21, recording/readout head 22 and loop chamber 3..

Figure 4:
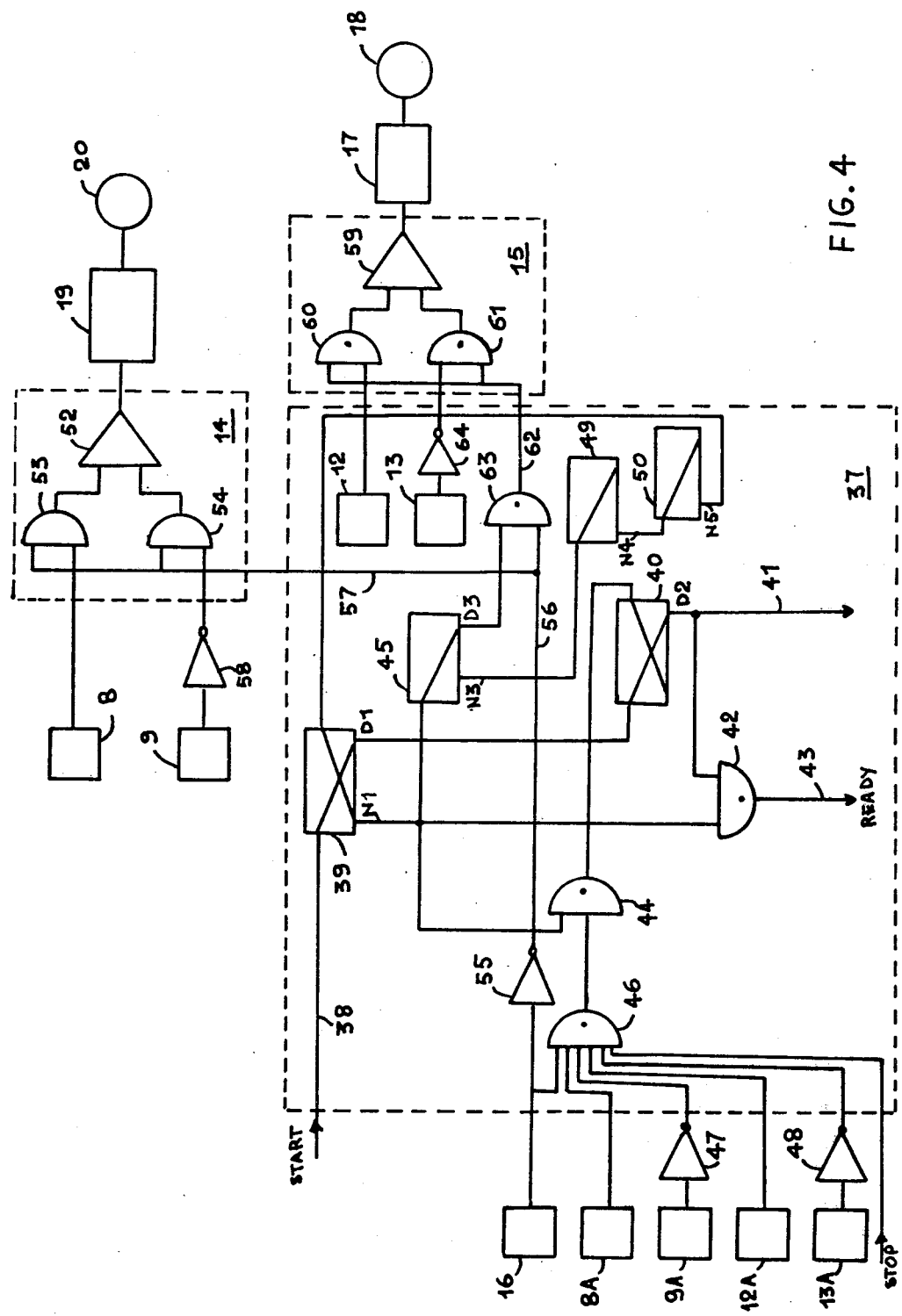
FIG. 4 illustrates a preferred control circuit employed with the present invention.

FIG. 4 represents in logical block diagram form the control circuitry used in the operation of the present invention, showing in detail the implementation of the control networks 14, 15 and 37 of FIG. 1.

As explained above, the START pulse applied to control network 37 may be generated by actuating a suitable start button or switch to initiate the operation of the transport. The START pulse is applied to the SET input of a flip-flop 39 by way of a lead 38. The flip-flop is set by the START pulse and accordingly the direct output D1 assumes the logic level 1 and the inverted output N1 goes to logic level 0. Direct output D1 is connected to the SET input of a flip-flop 40, which is set as a result. The direct output D2 of flip-flop 40 rises to logic level 1. An output lead 41 connects the output D2 to vacuum pump 25 (FIG. 1), preferably through a suitable amplification stage, not shown.

Output D2 of flip-flop 40 is further connected to one input of a AND gate 42, whose other input is connected to the inverted output N1 of flip-flop 39. Since the flip-flops 39 and 40 are both set upon startup, the output 43 of gate 42 will be at logic level 0 during this period. Only when flip-flops 39 and 40 are in their RESET and SET states respectively, will the output 43 rise to logic level 1 to indicate a READY condition of the tape transport.

The inverted output N1 of flip-flop 39 is further connected to one input of an AND gate 44, as well as to the triggering input of a univibrator 45. The other input of AND gate 44 is connected to the output of an OR gate 46. The function of AND gate 44 is to inhibit temporarily the action of signals appied to OR gate 46 by the various transport monitoring devices dicussed above, which normally disable the operation of the tape transport when predetermined operating conditions are not met. Pressure transducer 16 provides a logical 1 signal to one input of the OR gate 46 when the vacuum pressure level deviates within preassigned tolerance limits, from a predetermined pressure level. similarly, photodetectors 8A and 12A provide logical 1 signals to respective inputs of the OR gate 46 when the upper operating zone limits monitored by these photodetectors are exceeded by the tape loops in loop chambers 4 and 3 respectively. Photodetectors 9A and 13A, which monitor the lower limits of the operating zones in loop chambers 4 and 3 respectively, provide logical 0 signals when the tape loops exceed these limits and hence they are connected to the OR gate 46 by way of inverters 47 and 48 respectively.

A further input to the OR gate 46 conveys a STOP command which is selectively applied when it is desired to stop the operation of the transport.

Each signal so applied to the OR gate 46 causes a responsive output signal to be applied to the input gate 44 gate 44 remains inhibited until flip-flop 39 is reset and gate 40 is set upon completion of the automatic tape loading operation. Until that point in time is reached and the tape transport is in its fully operative status, some or all of the normal operating conditions are not present. Accordingly, in order to start the operation of the transport, it is necessary to inhibit the disabling devices during the phase of the operation.

The univibrator 45, and other such circuits used in the present invention, are chosen to be triggered by the switching of a input signal from logical 1 to logical 0. Since the triggering input of univibrator 45 is connected to the inverted output N1 of the flip-flop 39, the signal applied to this univibrator switches from logical 1 to logical 0 when the flip-flop 39 is set by the START signal. As a result, univibrator 45 is triggered and its inverted output N3 rises to logical level 1. The output N3 remains at that level for a time interval $\Delta 1$ determined by the time constant of the univibrator. Simultaneously, the direct output D3 of univibrator 45 changes from logical 1 to logical 0 and remains in that state during the interval $\Delta 1$.

The inverted output N3 of univibrator 45 is connected to the triggering input of a second univibrator 49 which has a time constant $\Delta 2$. The inverted output of univibrator 49 is connected to the triggering input of a third univibrator 50 which has a time constant $\Delta 3$. The inverted output N5 of univibrator 50 is connected to the RESET input of the flip-flop 39.

In operation, when flip-flop 39 is set by the START pulse, the chain of univibrator 45, 49 and 50 is triggered. After a time interval $\Delta 1 + \Delta 2$ has elapsed, corresponding to the sum of the time constants of the univibrator 45 and 49, a pulse of duration $\Delta 3$ is generated by univibrator 50 which serves to reset the flip-flop 39. Thus, the automatic tape loading operation must be performed during the time interval $\Delta 1 + \Delta 2$. Upon the completion of that time interval the disabling devices become operative.

Automatic tape loading is further controlled by control networks 14 and 15 respectively. As seen from FIG. 4, network 14 comprises an operational amplifier 52 having direct and inverted inputs provided by a pair of AND gates 53 and 54. The gates 53 and 54 are connected to receive a signal from pressure transducer 16, by way of inverter 55 and leads 56 and 57. As soon as the vacuum pressure sensed by the transducer 16 reaches the predetermined pressure level, the signal so applied rises to logical 1 and gates 53 and 54 are enabled.

As previously explained photodetectors 8 and 9 monitor the position of the tape loop in the operating zone of loop chamber 4. The output of photodetector 8 is applied directly to a second input of AND gate 53, while the output of photodetector 9 is applied to a second input of AND gate 54 by way of an inverter 58. During the tape loading operation, the photodetectors 8 and 9 provide logical 1 signals. Accordingly, as soon as the gates 53 and 54 are enabled, a logical 1 signal is applied to the non-inverting input of amplifier 52 and a logical 0 signal is applied to the inverting input. Thus, a positive signal is provided on the output of amplifier 52, which is further amplified by power amplifier 19 to energize motor 20 for rotation of tape reel 2 in the desired direction.

During the automatic tape loading phase, the direction of motor 20, and hence of reel 2, is such as to dispense tape to the defined region 5 of compartment 71 and thence to loop chamber 4, assisted by the suction created by the vacuum pressure at the latter points. As soon as the tape loop forming in loop chamber 4 is sensed by photodetector 8, the signal applied to the non-inverting input of amplifier 52 goes to logical 0 and motor 20 is de-energized. If the tape loop descends to reach photodetector 9, e.g. due to the inertia of motor 20 and reel 2, a positive signal is applied to the inverting input of amplifier 52. This causes the motor 20 to be energized in the opposite direction so as to reverse its direction of rotation until the tape loop is again positioned within the working zone.

The time constant of univibrator 45 is choosen to provide a time interval adequate for the predetermined vacuum pressure level to be reached and for the tape loop to be positioned in the working zone of loop chamber 4. Control network 15, which is enabled at the end of the aforesaid time interval, comprises an amplifier 59 which is substantially identical to amplifier 52 in control network 14. Network 15 further includes a pair of AND gates 60 and 61, substantially identical to gates 53 and 54 respectively. The gates 60 and 61 are enabled by a control signal received from the output lead 62 of an AND gate 63. One input lead of gate 63 is connected to the direct output D3 of univibrator 45 and the other input is connected to the aforesaid output lead 56. Photodetectors 12 and 13 define the limits of the working zone in loop chamber 3. The output of photodetector 12 is connected to a second input of AND gate 60, while the output of photodetector 13 is connected to a second input of gate 61 by way of an inverter 64.

The output signal of gate 63 goes to logical 1 at the end of time interval $\Delta 1$, provided the desired vacuum pressure level has been reached, as monitored by pressure transducer 16. With the output of gate 63 at logical 1, gates 60 and 61 are enabled. Thereafter the operation of control network 15, in conjunction with power amplifier 17 and motor 18, is substantially identical to that of control network 14 and need not be further elaborated. As previously explained, motor 18 is rotated in a direction to cause tape from tape reel 1 to be dispensed into loop chamber 3, assisted by the vacuum pressure in the chamber. The time constant $\Delta 2$ of univibrator 49 is choosen to provide an adequate time interval for the positioning of the tape loop in the working zone of chamber 3.

At the completion of time interval $\Delta 2$, the automatic tape loading phase is completed and the signal appearing at the inverted output N4 of univibrator 49 triggers univibrator 50. The later issues an output signal on inverted output N5, which has a duration of $\Delta 3$ and which resets flip-flop 39. The logical 1 signal now appearing on the inverted output N1 of flip-flop 39 is applied to one input of AND gates 42, the other input of which was previously enabled by a signal derived from the direct output D2 of flip-flop 40. As a result, a READY signal is generated on the output 43 of AND gate 42.

Following the completion of tape loading, the tape transport goes into its normal operating mode described above, in which the photoelectric detectors of the loop chambers, in conjunction with the control networks 14 and 15 and their related power amplifier and motor components, rotate the corresponding tape reels in a direction to maintain the tape loops within the working zones of the respective loop chambers, independently of tape movement occasioned by the action of capstan 21.

As will be evident from the foregoing discussion, the semiautomatic tape loading apparatus which constitutes the subject matter of the present invention embodies within it a number of characteristic features that provide distinct advantages over prior art devices. Thus, the present invention offers greater reliability than is available with fully manual tape loading devices where the insertion of the tape into the loop chambers by the operator frequently leads to the introduction of foreign matter into the chambers which can materially impair proper operation of the tape transport. While fully automatic tape loading devices of the prior art avoid this particular problem, they have other disadvantages that reflect on their reliability. For example, the difficulty of automatically handling the relatively delicate tape often leads to failure in securely fastening the leading end of the tape to the permanent tape reel. Where such a situation arises, it frequently results in the loss of recorded data, or worse, in the destruction of a portion of the tape itself.

The present invention requires considerably less operator time or operator skill for the manual loading phase than is required in fully manual tape loading devices of the prior art. In addition, the semiautomatic tape loading system disclosed herein is inexpensive to implement, requiring only a minimal amount of equipment over and above what is required for normal tape transport operation. As such, it is also simple in operation and far more economical to build than fully automatic tape loading equipment of the prior art.

While a preferred embodiment of the invention has been shown and described, it will be apparent that numerous changes and modification will now occur to those skilled in the art without departing from the principles and the spirit of the present invention. For example, the invention is not limited to a single capstan tape transport, but is applicable to other types of tape transports as well. Similarly, the loop position monitoring equipment need not consist of photoelectric devices, but may use different kinds of sensing equipment. It will also be clear that the positions of the permanent and removable tapes reels may be switched without detracting from the scope of the invention. Additionally, by properly restructing the geometry of the apparatus shown, the relative vacuum pressure levels appearing at lines A—A and B—B respectively in FIG. 3 may be reversed so as to alter the sequence of steps by which tape is automatically loaded into compartment 71. In the latter case, tape reel 1 will be the first to rotate to dispense tape into loop chamber 3, followed by the tape dispensing action of reel 2.

Accordingly, the present invention is not confined to the preferred embodiment disclosed herein and is intended to be limited only by the full scope of the appended claims.

What is claimed is:

1. In a tape transport of the type using capstan means for selectively moving tape past a recording/readout station, said capstan means and said station being located in an enclosed compartment of said transport, a pair of tape reels rotatably supported externally of said compartment and selectively adapted to dispense or receive said tape traveling therebetween, means for manually inserting said tape into a first tape path extending from said reels into said compartment and conforming to a predetermined configuration imposed by the structure of said compartment, means for disabling the operation of said transport in the absence of predetermined operating conditions, means selectively actuated for automatically shifting said tape within said compartment in sequential steps from said first path into a second tape path, said second path extending between said reels and placing said tape into position for recording/readout operation, means for at least partially inhibiting said disabling means during the tape shifting operation, a pair of loop chambers located in said compartment each adapted to accept a tape loop when said tape is disposed in said second path, said capstan means being positioned in said second path substantially symmetrically with respect to said pair of loop chambers, means for applying vacuum pressure to said loop chambers to facilitate the formation of said tape loops under tension said apparatus further including an internal guide surface in a defined region of said compartment spaced from said capstan means and said loop chambers respectively and means for applying vacuum pressure to said defined region to conform said tape to said internal guide surface, said internal guide surface substantially constituting an extension of a tape contacting wall of one of said loop chambers, said surface deflecting said second tape path between said last recited loop chamber and one of said tape reels.

2. The apparatus of claim 1 wherein tape motion in a lateral direction is substantially constrained in said second path by a pair of parallel compartment walls spaced from each other a distance minimally exceeding the width dimension of said tape, one of said walls constituting a door providing access to said compartment, said door including a cut-out section extending from the opening door edge toward the center of said door, a cover panel slidably supported to permit access to said recording/readout station positioned therebeneath, said cover panel mating with said cut-out section when said door and said panel are in their closed positions to determine a slot therebetween adapted for manual insertion of said tape, said slot having said predetermined configuration and defining a portion of said first tape path.

3. The apparatus of claim 2 wherein said compartment door further includes a handle extending outwardly therefrom and presenting a surface contoured to substantially continue the configuration of said slot, said handle surface sloping inwardly toward said door to facilitate the insertion of said tape into said slot.

4. The apparatus of claim 2 wherein the shape of said cut-out section approximates a triangle based on said opening door edge and having converging sides terminating in a rounded apex, the configuration of said slot substantially conforming to the sides and apex of said triangle.

5. Semiautomatic tape loading apparatus for use in a tape transport of the type employing capstan means for selectively moving tape past a recording/readout station, said capstan means and said station being located in an enclosed compartment of said transport, said compartment further including a pair of loop chambers spaced from said capstan means and symmetrically positioned with respect to the latter, an internal guide surface positioned in a defined region of said compartment spaced from said capstan means and said loop chambers respectively, means for applying vacuum pressure to said loop chambers to facilitate the formation of tape loops therein, a pair of tape reels external to said compartment selectively adapted to dispense or receive tape traveling therebetween, means for individually rotating said tape reels to control the position of said loops within said loop chambers independently of said capstan means, means for monitoring the vacuum pressure level and the position of said tape loops respectively in said loop chambers, means for applying said vacuum pressure to said defined compartment region adapted to conform said tape to said internal guide surface, means responsive to said monitoring means for disabling the operation of said tape transport upon deviation from a predetermined pressure level or from a predetermined loop position zone respectively, means for manually inserting said tape into a first tape path, said first tape path extending from said reels into said compartment and encompassing substantially only said recording/readout station within said compartment, means for automatically shifting said tape upon command from said first path to a second tape path extending between said reels, said second path additionally including within said compartment said loop chambers, said capstan means and said internal guide surface, said automatic tape shifting means including means for initiating the application of vacuum pressure to said loop chambers and to said defined compartment region, means responsive to said monitoring means for initiating rotation of one of said tape reels upon attainment of said predetermined pressure level, said last recited rotation being responsive to said monitoring means and being effective to dispense tape into one of said loop chambers until a loop position within said predetermined zone is reached therein, means effective a predetermined time interval after said tape dispensing action is initiated to rotate the other of said pair of reels, said last recited rotation being responsive to said monitoring means and being effective to dispense tape into the other of said loop chambers until a loop position within said predetermined zone is reached therein, and means for at least partially inhibiting said disabling means until the shifting of said tape from said first to said second tape path has been effected.

6. In a magnetic tape transport of the type using capstan means for selectively moving tape past a magnetic recording/readout head, said capstan means and said head being located in an enclosed compartment of said transport, said compartment further including a pair of loop chambers symmetrically positioned below said capstan means, a door adapted to provide access to said compartment, a pair of tape reels external to said compartment selectively adapted to dispense or receive said tape traveling therebetween;

semiautomatic tape loading apparatus comprising means for manually inserting said tape into a first tape path extending from said reels into said compartment, said manual insertion means including a cut-out section in said door approximating the shape of a triangle based on the opening door edge, the sides of said triangular cut-out section converging toward the center of said door and terminating in a rounded apex, a cover panel slidably supported to permit access to said recording/readout head positioned therebeneath, said cover panel mating with said cut-out section when both the door and the cover panel are closed to determine a slot therebetween, the configuration of said slot substantially conforming to the sides and apex of said triangular cut-out section and defining a portion of said first tape path, said compartment door including a handle extending outwardly therefrom and presenting a surface contoured to substantially continue the configuration of said slot, said handle surface sloping inwardly toward said door to facilitate manual insertion of said tape into said slot, means selectively actuated for automatically shifting said tape in sequential steps from said first path into an operative second tape path extending between said reels, said automatic shifting means including an internal guide surface positioned in said second tape path in a defined region of said compartment above said capstan means, said guide surface substantially extending a tape contacting wall of one of said loop chambers and deflecting said second tape path between the latter loop chamber and one of said pair of tape reels, said second tape path further including said pair of loop chambers and said capstan means therebetween, means for applying vacuum pressure to each of said loop chambers to facilitate the formation of tape loops under tension therein, means for applying said vacuum pressure to said defined compartment region to conform said tape to said guide surface, means for monitoring said vacuum pressure for the maintenance of a predetermined pressure level, means for monitoring the position of said loops in said loop chambers, means responsive to said position monitoring means for individually rotating said tape reels to maintain each of said loops within a predetermined zone of its loop chamber independently of the action of said capstan means, means responsive to respective ones of said monitoring means for disabling the operation of said transport when deviations from the monitored operating conditions are sensed, means responsive upon actuation of said automatic shifting means for initiating the application of said vacuum pressure, means responsive to said pressure monitoring means for initiating the rotation of said one tape reel when said predetermined pressure level is reached, said rotation occurring in a direction to dispense tape to said defined compartment region and thence to said one loop chamber, means effective after a first predetermined time interval has elapsed following the start of the tape dispensing action of said one reel to initiate rotation of the other one of said pair of tape reels in a direction to dispense tape to the other one of said pair of loop chambers, the tape dispensing action of said reels being assisted by the vacuum pressure applied to said defined compartment region and to said loop chambers respectively, means for at least partially inhibiting said disabling means until the shifting of said tape to said second tape path has been completed, and means effective after a second predetermined time interval has elapsed following the start of the tape dispensing action of said other tape reel to render said transport operational.

* * * * *